(12) United States Patent
Nadas et al.

(10) Patent No.: US 8,547,844 B2
(45) Date of Patent: Oct. 1, 2013

(54) SYSTEM AND METHOD FOR BALANCING IP GATEWAY SERVICES

(75) Inventors: Stephen Nadas, Raleigh, NC (US); Venugopalan Ullanatt, Cary, NC (US); Sanjay Khanna, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1228 days.

(21) Appl. No.: 11/775,422

(22) Filed: Jul. 10, 2007

(65) Prior Publication Data

US 2009/0016215 A1    Jan. 15, 2009

(51) Int. Cl.
*H04L 12/26* (2006.01)
*H04L 12/28* (2006.01)

(52) U.S. Cl.
USPC .................. 370/235; 370/397; 370/409

(58) Field of Classification Search
USPC ................ 370/230, 235, 397, 409
See application file for complete search history.

(56) References Cited

U.S. PATENT DOCUMENTS

| | | | |
|---|---|---|---|
| 6,397,260 B1 * | 5/2002 | Wils et al. .............. | 709/238 |
| 6,754,220 B1 * | 6/2004 | Lamberton et al. ....... | 370/401 |
| 7,716,370 B1 * | 5/2010 | Devarapalli ............. | 709/245 |
| 2003/0037165 A1 * | 2/2003 | Shinomiya ............. | 709/238 |
| 2005/0025051 A1 * | 2/2005 | Roeder ................. | 370/230 |
| 2005/0025179 A1 | 2/2005 | McLaggan et al. | |
| 2005/0135343 A1 * | 6/2005 | Karino et al. .......... | 370/352 |
| 2006/0018320 A1 * | 1/2006 | Choi ..................... | 370/392 |
| 2006/0098665 A1 * | 5/2006 | Quick .................... | 370/401 |
| 2006/0168084 A1 * | 7/2006 | Kogan et al. ........... | 709/207 |
| 2006/0205509 A1 * | 9/2006 | Hirota ................... | 463/40 |
| 2007/0230472 A1 * | 10/2007 | Jesuraj .................. | 370/392 |
| 2008/0151882 A1 * | 6/2008 | Sanjay et al. ........... | 370/389 |
| 2008/0153491 A1 * | 6/2008 | Cho et al. ............... | 455/435.1 |

* cited by examiner

*Primary Examiner* — Mark Rinehart
*Assistant Examiner* — Christopher R Crompton

(57) ABSTRACT

A method and system are disclosed for distributing load in a network. A set of routers are configured for providing IP gateway services to a set of hosts where each router in the set of routers all back up all the other routers in the same set. Each router in the set utilizes identical load distribution policies, load distribution properties and load distribution arrangement. A Load Distribution Function (LDF) master router is determined for the set of routers, wherein each one of the set of routers is a backup for the LDF master router. Every router in the set of routers utilize the same algorithm to compute load distribution and the LDF master router provides balancing information to all the other routers by including that information in VRRP advertisement messages to all the routers.

20 Claims, 7 Drawing Sheets

| VERSION | TYPE | VIRTUAL RTR ID | PRIORITY | COUNT IPV6 ADDR |
|---|---|---|---|---|
| (RSVD) | ADVER INT | | CHECKSUM | |
| IPV6 ADDRESS(ES) | | | | |
| L | (RSVD) | POS | LDF LAST INDEX | (RSVD) |

*FIG. 6A*

| VERSION | TYPE | VIRTUAL RTR ID | PRIORITY | COUNT IP ADDR |
|---|---|---|---|---|
| AUTH TYPE | ADVER INT | | CHECKSUM | |
| IP ADDRESS (1) | | | | |
| ⋮ | | | | |
| AUTHENTICATION DATA (1) | | | | |
| AUTHENTICATION DATA (2) | | | | |
| L | (RSVD) | POS | LDF LAST INDEX | (RSVD) |

*FIG. 6B*

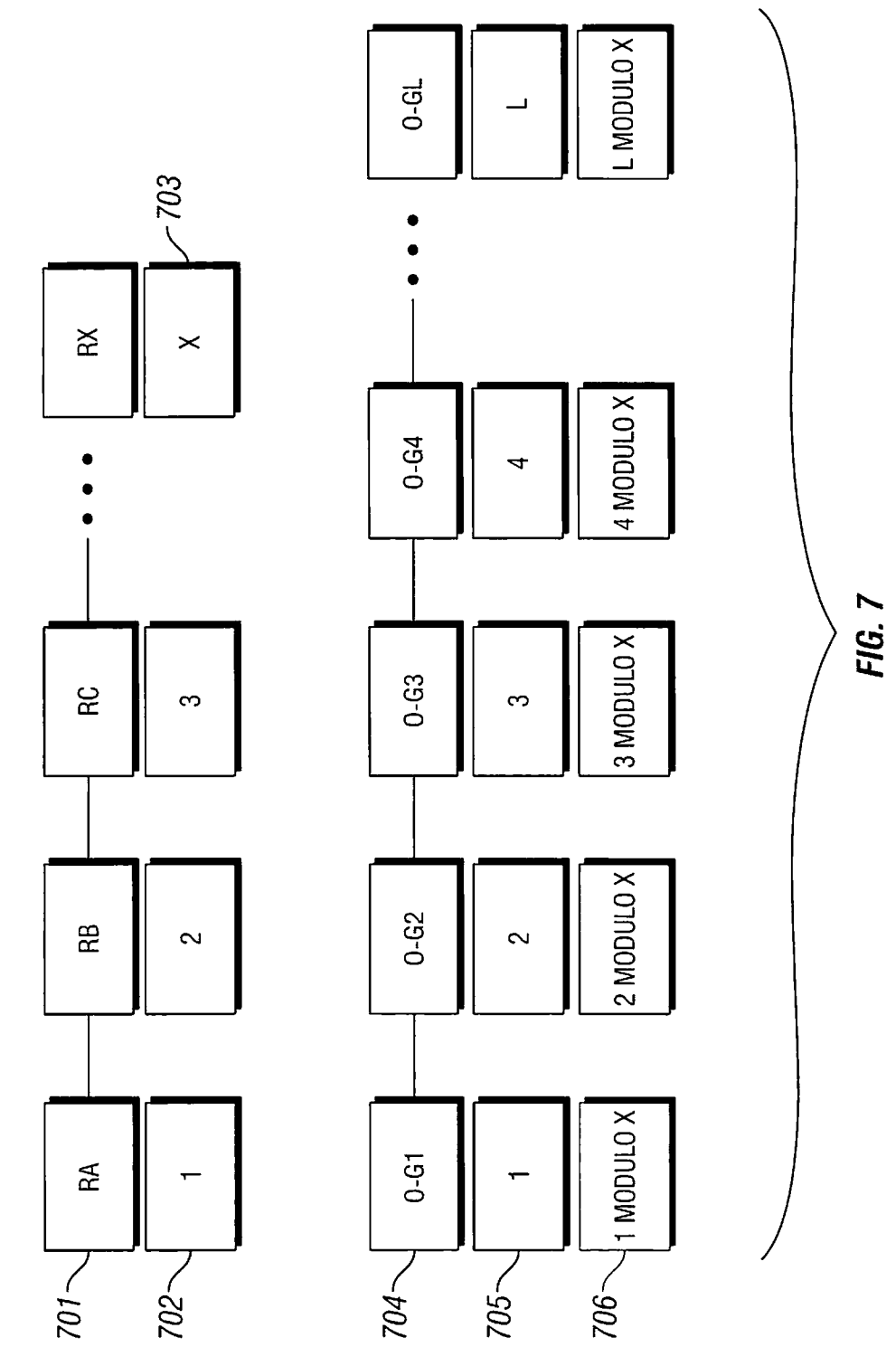

SYSTEM AND METHOD FOR BALANCING IP GATEWAY SERVICES

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to load balancing in an Internet Protocol (IP) network. More particularly, and not by way of limitation, the present invention is directed to a system and method for load balancing IP gateway services in a resilient manner.

The following is a list of acronyms and their definitions that used in the body of the specification, which shall apply throughout the specification unless otherwise noted.

ACRONYMS:

ARP—Address Resolution Protocol
DHCP—Dynamic Host Configuration Protocol
IP—Internet Protocol
IPv4—Internet Protocol version 4
IPv6—Internet Protocol version 6
L2—Layer 2
L3—Layer 3
LDF—Load Distribution Function
MAC—Media Access Control
ND—Neighbor Discovery
NS—Neighbor Solicitation
RD—Router Discovery
RR—Round Robin
VIP—Virtual IP
VMAC—Virtual Media Access Control
VRRP—Virtual Router Redundancy Protocol
VRRPv2—Virtual Router Redundancy Protocol version 2
VRRPv3—Virtual Router Redundancy Protocol version 3
WRR—Weighted Round Robin

PRIOR ART AND PROBLEMS

Load Distribution, or Load Balancing is technology used to distribute load over a set of servers to provide capacity and/or resiliency. The Virtual Router Redundancy Protocol (VRRP) is technology used to provide some resiliency solutions in IP networks.

VRRP provides resiliency by arranging for traffic to be sent by hosts on the same subnet to a destination IP address (L3) using the default router's virtual MAC address (VMAC) as the destination MAC address. VRRP defined MAC address for a VRRP group determined by the version of VRRP and the VRRP group (for example, for vrrpv2, and VRRP group 20, the VMAC is 00-00-5E-00-01-14 in hex in internet standard bit-order). A router is said to be the VRRP master when it is programmed to forward traffic sent to the VMAC. A VRRP master sends advertisements to the routers that backup the master indicating that the VRRP master is operating. A lack of VRRP advertisements indicates that the master is down. One (or more) other routers back up the VRRP master by monitoring the VRRP master's VRRP advertisement messages. When a VRRP backup detects that it has stopped receiving VRRP advertisements from the VRRP master, the VRRP backup reprograms itself to forward traffic sent to the VMAC; even though hosts continue to send traffic to the VMAC and are unaware that the VRRP master has changed. A classic VRRP arrangement is that two (or more) VRRP enabled routers backing up each other to provide a VRRP protected virtual IP (VIP) address on an Ethernet LAN (see FIG. 1). Hosts use these routers as their default route via a VIP address which is protected by the VRRP pair of routers; the router pair runs the VRRP protocol and if one router fails, the other router provides gateway services transparently to the hosts.

It is natural to combine Load Balancing and VRRP technologies to provide mechanisms to share the load. The load is IP traffic generated by hosts, which is forwarded toward the IP destinations by routers. The load can be manually balanced, where half of the hosts are configured to use one VIP and the other half another VIP. Each of the VRRP routers provides one of the VIPs and acts as backup for the other VRRP router's VIP. If one router fails, the other takes the entire load transparently to all the hosts. When both routers are available, the load is split between them.

One approach to improve the distribution is to force the request to one master router, which manages the load balancing aspect and participates in a separate protocol between the servers.

A typical nominal, minimum time to detect a router failure is measured in seconds. Some approaches improve on the time to detect by introducing sub-second VRRP in which VRRP advertisements are sent at much higher rates to detect a failure of the master VRRP faster in a much shorter time. As described above, VRRP advertisements indicate that the master router is still operational. If the master router fails or becomes unreachable, the backup router with the highest priority value becomes the new master router.

One problem with the prior art is that as the number of routers used to support a growing number of hosts grows, it requires a cumbersome scheme to reconfigure hosts to use 'n' default gateway routers. Secondly, if more routers are added on the LAN, it requires more manual reconfiguration on the hosts. For example, consider 'n' routers using VRRP to back each other up in some manner and 'n' of the hosts are configured to use the VIP from one of the routers, i.e., there are 'n' sets of hosts each consisting of '1/n' of the hosts and each set must be differently configured to use one of the 'n' routers.

The amount of time needed to notice a failure of a router and to respond to the failure is another complex problem. It would be advantageous to have a system and method for automatically and optimally load balancing IP router services that overcomes the disadvantages of the prior art.

BRIEF SUMMARY OF THE INVENTION

A set of 'N' routers is used to provide IP gateway services to a (much) larger set of 'H' hosts. Using VRRP, each router in the set of routers backs up the other routers in the set. Each router programs its Ethernet receive mechanism to receive all the VRRP MAC address for all N*(N−1) VRRP groups. The VRRP function is enhanced to carry additional, load-balancing related information in the VRRP advertisement messages. "Enhanced VRRP", means VRRP with the enhancement of carrying additional, load-balancing related information in the VRRP advertisement messages. This enhanced VRRP function supports the independent load distribution function.

The desired load distribution policies, properties and arrangement is configured into all of the participating routers. The set of 'N' routers all use the same algorithms to compute the information needed to distribute the load. At all times, exactly one router, in addition to being VRRP master for some of the VRRP groups, also acts as "load distribution function" (LDF) master and makes the load balancing decisions for the set. At any point in time, any one of the other routers (i.e., not the LDF master) in the pool may take over as a LDF master should the current LDF master become unavailable. The LDF master router "piggybacks" extra load balancing information on its VRRP advertisement messages. Since all of the other routers in the set are VRRP backups for the LDF, they receive VRRP advertisements from the LDF and see the piggybacked information. This information is used by a new LDF master, if the current LDF master fails or a new LDF master appears.

Requests for router services are made when hosts prepare to send IP traffic but do not have the MAC address for the default router. Typically, a host is configured with the IP address of the default router. An IPv4 host broadcasts ARP who-has messages on an Ethernet LAN. An IPv6 host multicasts NS messages on an Ethernet LAN. In the prior art the VRRP master router responds with the VRRP MAC address.

All 'N' routers in the set implement VRRP. All the routers in the LDF set are configured with the same LDF related configuration information. All of the routers are enhanced to prepare an LDF table based on the LDF configuration; since they receive identical configuration information, they compute identical LDF tables. These enhanced routers, when receiving VRRP advertisements, also parse added LDF information and determine (algorithmically) which of LDF set members will act as LDF master. All of the non-LDF enhanced VRRP routers send some LDF information on their VRRP advertisements. Additionally, when an VRRP router is operating as an LDF master it sends LDF data that describes the current state of its LDF mechanism on its VRRP advertisements. All of the enhanced VRRP routers receive the broadcast ARP "whohas" messages, but only the VRRP router acting as LDF master responds to them. It makes an LDF decision to use one of the enhanced routers in the LDF table, and then answers the "whohas" message with a VMAC for the chosen VRRP group. Only one router will be master for that VRRP group. Henceforth, traffic from that host will be forwarded by the chosen VRRP router. The LDF master distributes the request by choosing a router and sending the requestor the chosen router's MAC address in the ARP or NS reply. Thus, the LDF master distributes traffic from the hosts to the enhanced VRRP routers in the LDF set. Certain policies, such as equal cost round robin, weighted round robin, weighted least connection, etc., can be used by the LDF master to distribute load when responding to the ARP requests.

BRIEF DESCRIPTION OF THE SEVERAL VIEWS OF THE DRAWING

In the following section, the invention will be described with reference to exemplary embodiments illustrated in the figures.

FIG. 6 is a diagram of the extended VRRP advertisement packets which are send by LDF masters in accordance with a preferred embodiment of the present invention; and FIG. 7 is a diagram showing the data structures used when more than 1 router is down and each active router must determine the "orphaned" VRRP groups for which it must assume mastership in accordance with a preferred embodiment of the present invention.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
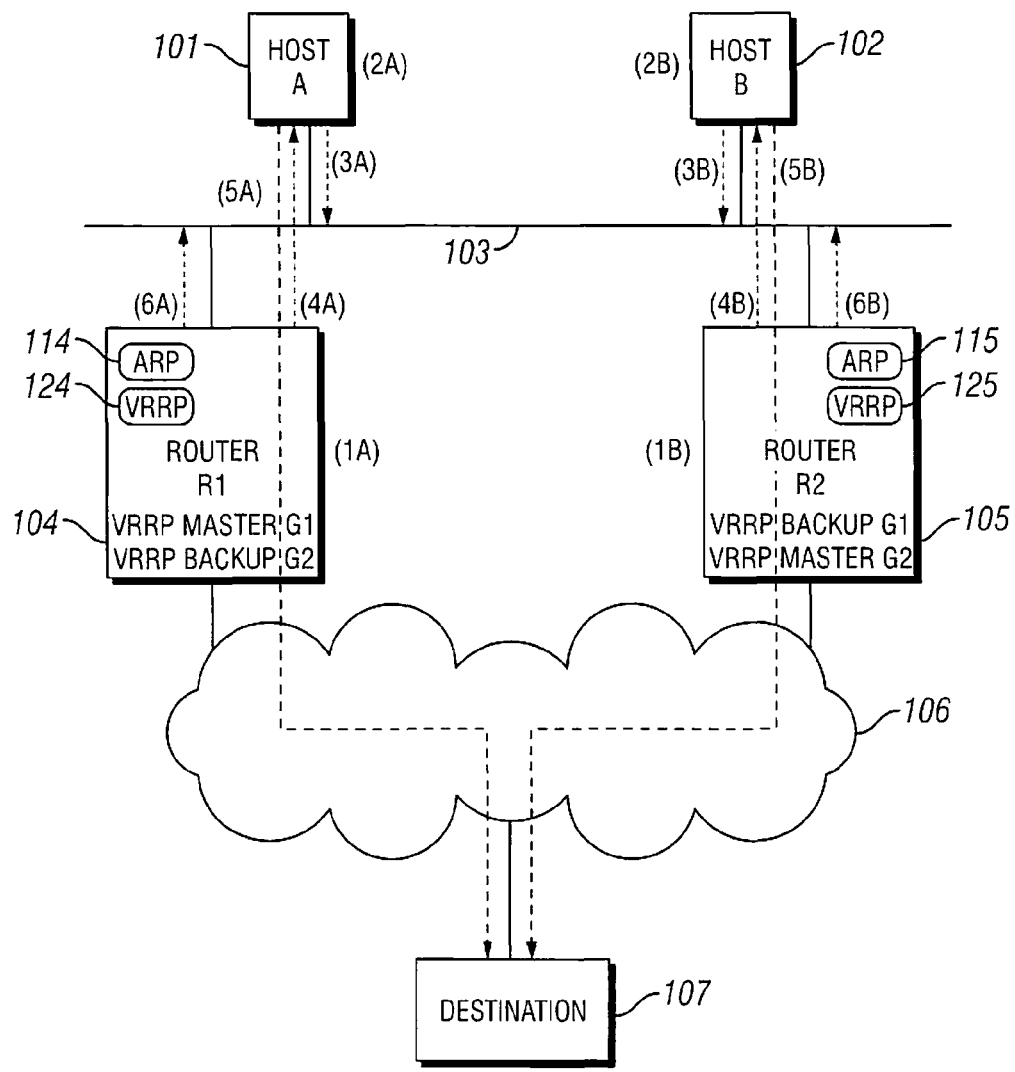
FIG. 1 is a block diagram depicting two hosts receiving gateway services from two routers.

The diagram in FIG. 1 depicts two hosts receiving gateway services from two routers. The diagram shows the flows between these elements necessary for a host to send traffic to a destination. Of course, in practice, the number of hosts 'H' is much larger than the number 'N', of routers. The elements depicted are: host A 101, host B 102, an Ethernet 103 interconnecting Host A 101 and B 102 and Routers R1 104 and R2 105, Router R1's ARP function 114, Router R1's VRRP function 124, Router R2's ARP function 115, Router R2's VRRP function 125, An arbitrary IP network 106 connects R1 and R2 to 107, the destination.

Figure 2:
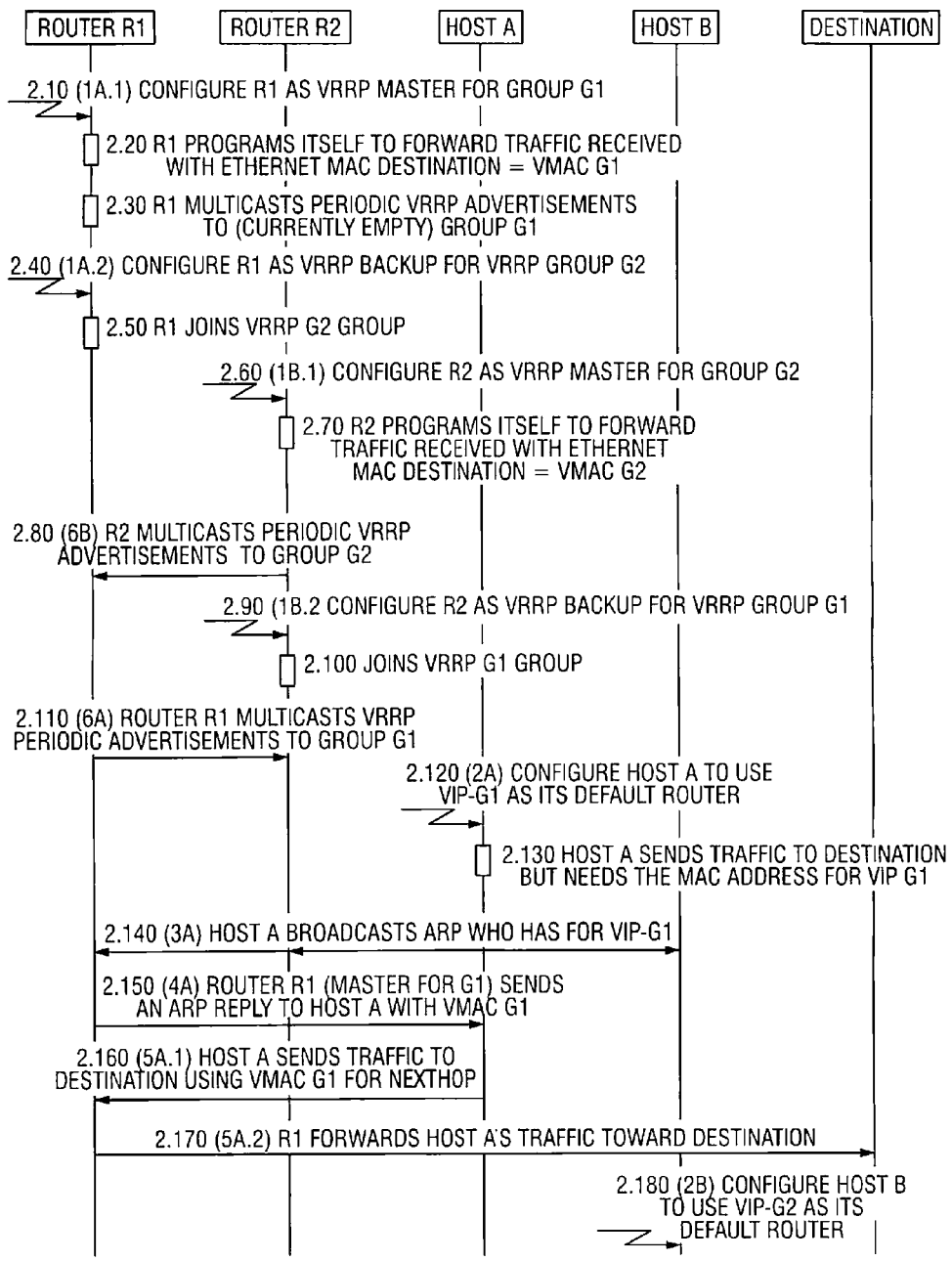
FIG. 2 is an event sequence diagram, to be read with respect to FIG. 1 that illustrates configuration action on the basic ARP flow for a host to receive the MAC address information it requires to send traffic.

FIG. 2 is an event sequence diagram, where time is running down, the sequence is to be read in concert with FIG. 1. Configuration action details are illustrated with respect to the routers and hosts and the basic ARP flow for a host to receive the MAC address information it requires to send traffic. The diagram contains references to the bold numbers in parentheses in FIG. 1.

Figure 3:
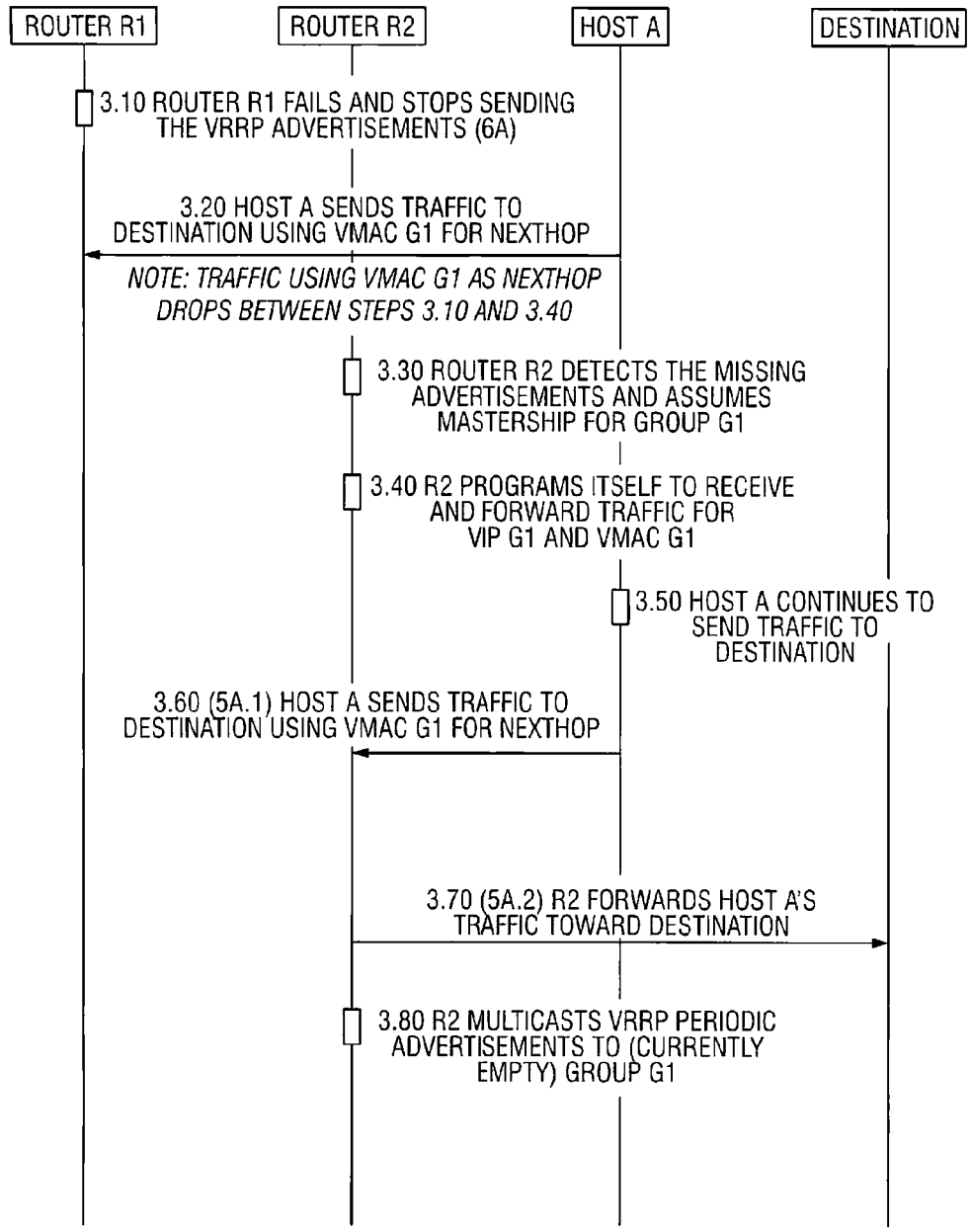
FIG. 3 is an event sequence diagram, to be read with respect to FIG. 1, that depicts the VRRP actions when one of the VRRP routers fails.

FIG. 3 depicts an event sequence diagram showing where time runs downward and shows the VRRP actions when one of the VRRP routers fails. The diagram contains references to the bold numbers in parentheses in FIG. 1 and FIG. 3 should be read in concert with FIG. 1.

Figure 4:
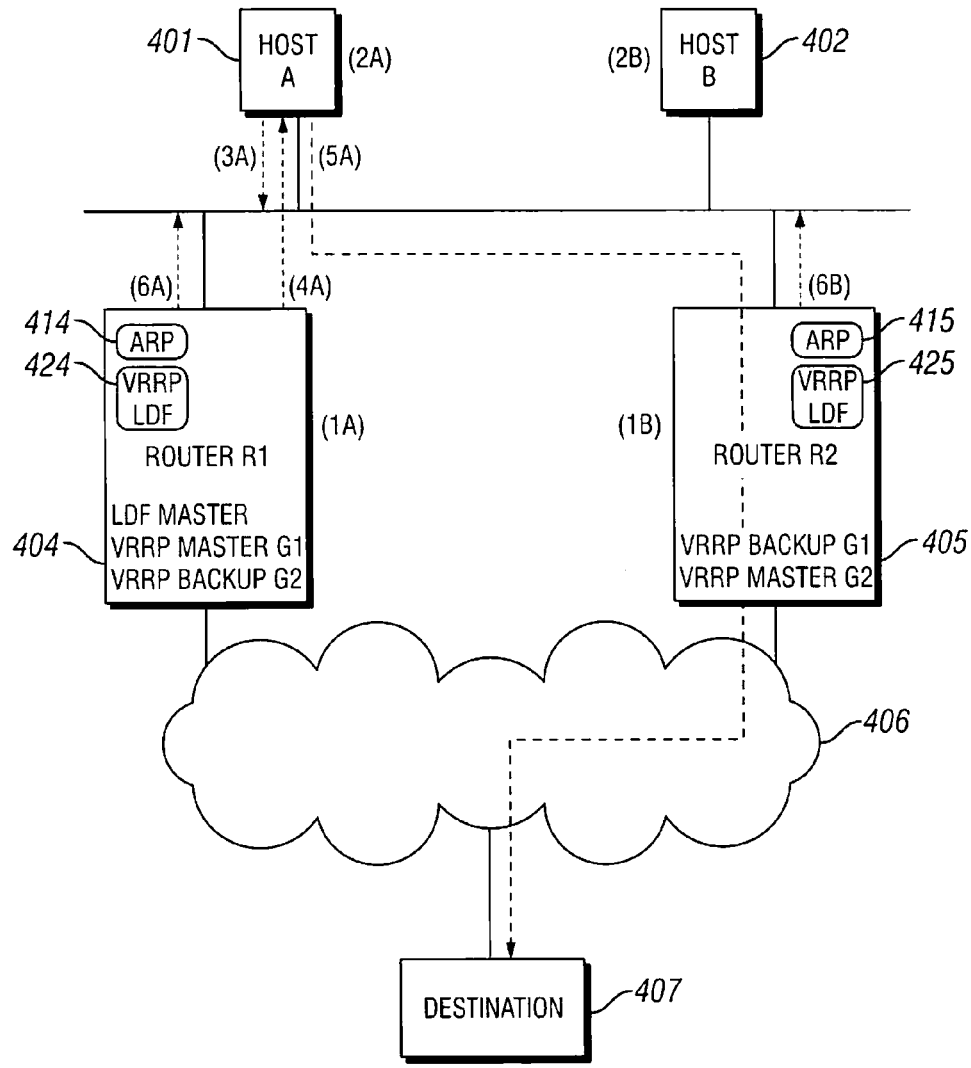
FIG. 4 is a block diagram illustrating an example of where the described functions may be located, in accordance with an embodiment of the present invention.

FIG. 4 depicts a high-level block diagram of a group of hosts (401, 402) serviced by a much smaller group of routers (404, 405) according to an embodiment of the present invention. In the figure, only two hosts are depicted for the sake of clarity. Depicted in this figure are host A 401, host B 402, Ethernet 403 interconnecting host A 401 and host B 402. Routers R1 404 and R2 405, along with Router R1's ARP function 414 and Router R1's VRRP and LDF function 424 are depicted as well as Router R2 405, router R2's ARP function 415 and Router R2's VRRP function, 425. An arbitrary IP network 406 connects R1 404 and R2 414 to destination 407. Router R1 404 is acting as LDF master; while this is the case the ARP function in Router R2 405 is not used to answer ARP who has messages. 'H' number of hosts are provided routing services by 'N' routers and 'H' is much greater than 'N'. Assume that, for IPv4, a VRRP is available (VRRPv2) that sends advertisements at sub-second rates.

Note that a load distribution function, LDF, (LDF 424 and LDF 425) is present in each router.

In a preferred embodiment, the 'N' routers use a meshed VRRP configuration; that is, each router is setup as a VRRP master for (N−1) VRRP groups. Each of the other (N−1) routers is a VRRP backup for these (N−1) groups. Hence, there are N*(N−1) VRRP groups in total. Each router, Ri, in the set of routers, masters N−1 VRRP groups and is a VRRP backup for the remaining (N−1)*(N−1) VRRP groups. For example, if N=4, then there are twelve (N*(N−1)=12) VRRP groups in total and each 'Ri' is a VRRP master for three (N−1=3) VRRP groups and a VRRP backup for nine ((N−1)*(N−1)=9) VRRP groups.

In particular, a mechanism is described below that has the following properties, where as mentioned above load is IP traffic generated by hosts, which is forwarded toward the IP destinations by routers:

the hosts are configured to use a single IP address for their default gateway, either statically or via, e.g., DHCP or, for IPv6 they can use router discovery (RD);

load is dynamically adjusted as routers come and go load is optimally adjusted as routers come and go load is shared according to a policy (Round Robin or Weighted RR; though other policies are also possible);

load balancing can be configured for a larger number of routers than used initially (that is, some of the routers may be added later) to anticipate future growth up to a maximum of 16 (based on maximum 255 VRRP groups); and Information describing the load balancing state is distributed.

The same load balancing related configuration information is configured on all the routers providing the LDF function (424, 425):

SV: starting value for the VRRP groups

N: the maximum number of routers that will ever participate [2 ... 16]

POS: each router is configured with its own position within the group

POL: the policy used to distribute hosts (round robin or weighted round robin, note that other policies are possible)

W: if weighted round robin is used, these are the N weights, one per router This means the same SV, N, POL and W are configured on all the routers that are to participate; each of these routers will have their own individual POS configured.

The desired load distribution policies, properties and arrangement are configured identically into all participating routers (except each router has its own unique POS). Given this configuration information, each router independently computes the table below. (Note that data structures other than a table are possible but these are not considered further.) The elements on the diagonals of this matrix are left empty. This table can be filled in various algorithmic manners, so that the N*(N−1) groups are placed, one per non-diagonal element, starting with SV. This shows a column-wise approach; however, a row-wise approach works as well (a running example will follow).

The set of non-diagonal elements in the ith column (i being the number of columns in the table that displays the participating routers) is the set of VRRP groups for which Ri is the VRRP master. The off-diagonal elements, for the jth row, list the additional groups that the Rj will master if and when Ri (i does not equal j) is unavailable.

TABLE 1

| POS | | 1<br>R1 | 2<br>R2 | ... | N<br>RN |
|---|---|---|---|---|---|
| 1 | R1 | — | $SV + (N-1)$ | | $SV + (N-1)^2$ |
| 2 | R2 | SV | — | | $SV + (N-1)^2 + 1$ |
| ... | ... | ... | ... | | ... |
| N | RN | $SV + (N-2)$ | $SV + (N-1) +$<br>$(N-2)$ | | — |

For example, suppose the number of routers N=5, and the starting group value SV=101, and the column-wise approach is taken. Note that SV, which is determined by configuration, must satisfy $SV+N*(N-1)<=255$ because the resulting numbers must all be valid VRRP group numbers from the range (1-255). The for the running example, the table will be:

TABLE 2

| POS | | 1<br>R1 | 2<br>R2 | 3<br>R3 | 4<br>R4 | 5<br>R5 |
|---|---|---|---|---|---|---|
| 1 | R1 | — | 105 | 109 | 113 | 117 |
| 2 | R2 | 101 | — | 110 | 114 | 118 |
| 3 | R3 | 102 | 106 | — | 115 | 119 |
| 4 | R4 | 103 | 107 | 111 | — | 120 |
| 5 | R5 | 104 | 108 | 112 | 116 | — |

Note that:

there are N*(N−1)=5*4=20 VRRP groups.

when all the routers are up, router [i] (Ri) is VRRP master for the groups in column [i]. For a general case Router Ri is the VRRP master for the groups in column i and Ri is a VRRP backup for the remaining groups.

Suppose that one or more routers from the set of all N routers are unavailable. For each available router Ra, and each unavailable router Ru, row a, column u of the table tells router Ra the additional VRRP group number for which Ra should be VRRP master (while router Ru is unavailable)

Note that when only one router is unavailable, the remaining routers each take ownership of one VRRP group's virtual MAC (VMAC) from the failed router and this will account for all the VRRP groups that the failed router was mastering. When more than one router is unavailable, a set of enhanced routers will each find the elements of the table from rows and columns that correspond to the unavailable routers; each of the enhanced routers will make an algorithmic (local) decision to determine which of these groups to take and each reprograms their Ethernet receive mechanisms to receive packets with these virtual MACs.

Each router is configured with its own position within the load balancing scheme. For example, router R4 in the table above is configured with position 4.

Load Distribution Function (LDF) Master

The routers agree on a procedure to select one of the group as the LDF master; that is, the router that is to make the load balancing decisions. One simple way to do this is for the router that has the numerically highest IP address on the LAN declares itself as the master router. When another router with a higher numerically higher IP address appears, the set of routers will see this higher IP address as the source address in a VRRP advertisement, and the current master will silently relinquish mastership. Similarly, if the routers determine that the current LDF master is no longer sending VRRP advertisements, then the router with the next highest IP will take over the mastership (the routers are constantly comparing all router addresses in order to determine when a new IP address appears and when an existing router that was sending advertisements stops sending the advertisements).

The LDF master maintains a list of groups which it has formed in an algorithmic manner. This is the list used in the round-robin processing. The list depends upon the policy (different load distribution policies may have different lists.)

To continue the example above, assume that round-robin is the policy (POL) and for IP addresses, R5's IP address is numerically highest among all the enhanced VRRP, thus if all the routers are online, R5 is the LDF master.

For the round robin policy, at configuration time, the LDF master forms Table 2 as shown and then forms a list of routers by ignoring the diagonals in the table and traversing the table row-wise to produce the list {105, 109, 113, 117, 101, 110, 114, 118, 102, 106, 115, 119, 103, 107, 111, 120, 104, 108, 112, 116}. Simple round robin (that is, round robin with all servers having equal weight) performed on this list will balance the incoming requests, that is, the first request to come is assigned to VRRP group 105, the second request to VRRP group 109 and so on. After the 20th request, the list is used in a circular manner.

The ARP "whohas" or NS (IPv6) message must reach the LDF master. In the IPv4 case, this is fairly straightforward since the message is broadcast, and only the LDF master responds. In the IPv6 case, hosts need to be forced to request the L2 address of their gateway. This can be done by setting the source MAC to null on previous Router Discovery (RD) packets (when RD is used). Then a NS message is sent (multicast) and only the LDF master answers.

In VRRP each VRRP master periodically sends an advertisement. Each VRRP master includes its own position in a new information element in the VRRP advertisement message. In addition to its position, for Round Robin or Weighted Round Robin (WRR) policies, the LDF master also sends an indication of the last load balancing decision it made. For example, in the simple RR case, the set of routers can be viewed as a list, and the LDF master sends the list index that it assigned to the last request.

To continue the example (with all routers up), after two hosts requests have come to the LDF, the LDF adds to its subsequent VRRP advertisements that its position is 5, since the current LDF is R5, and it last used list index 2 with respect to its list.

Other types of load distribution policies can be implemented using similar techniques. One example is least connection (and weighted least connection) where the load balancing function balances the number of connections. In this case, each router would send the connection counts per VRRP group, so that the LDF master could use that information to balance according to this policy.

Figure 5:
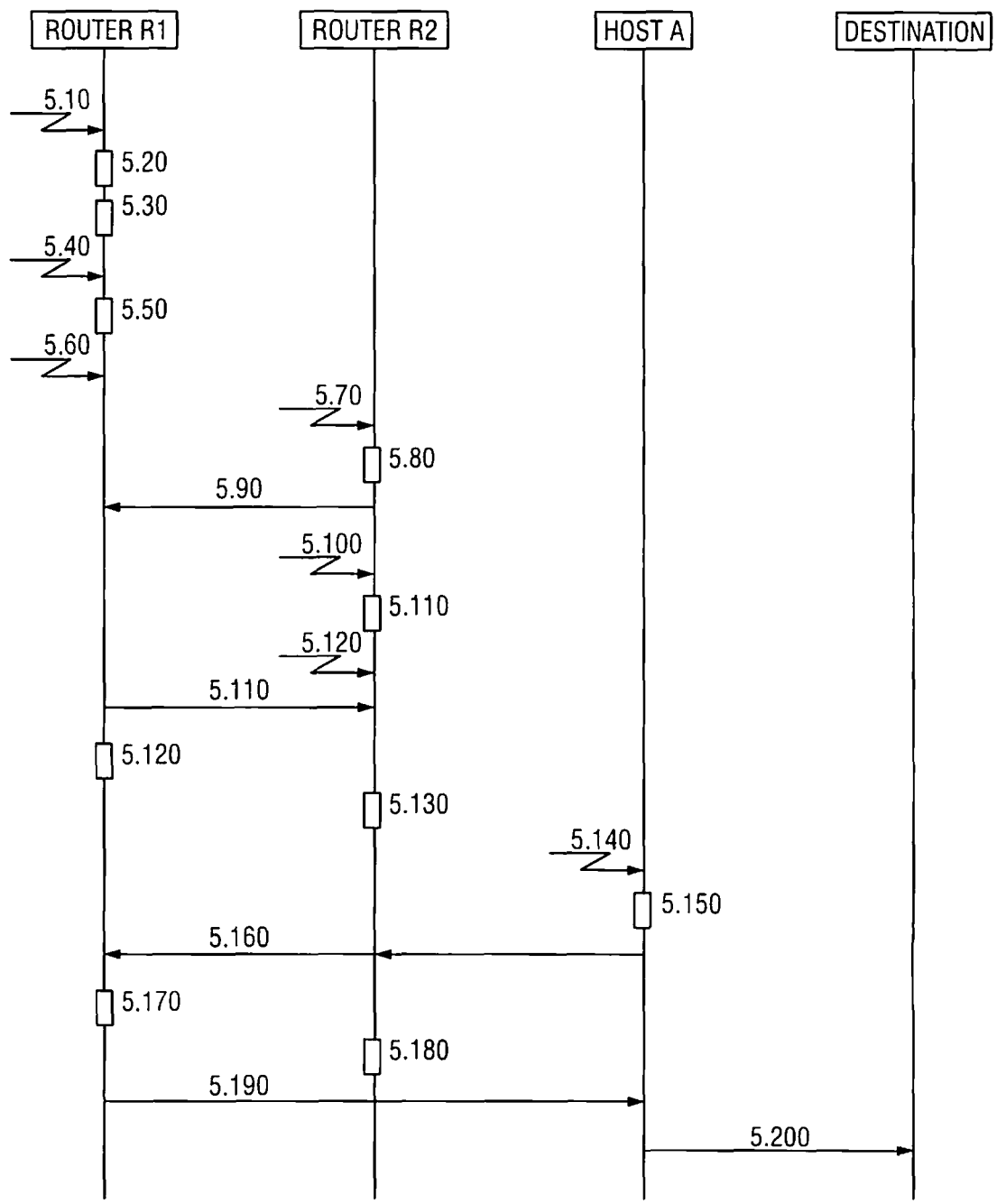
FIG. 5 is an event sequence diagram where time runs downward, depicting a preferred embodiment, to be read with respect to FIG. 4 that depicts the configuration action details on the routers and hosts, and the basic ARP flow for a host to receive the next-hop information required to send traffic.

FIG. 5 illustrates a high-level startup process in accordance with an embodiment of the present invention. In step 5.10, the operator configures Router 1 (R1) as VRRP master for VRRP group G1. This initiates the action in step 5.20 where R1 sets itself up to receive packets sent with the VRRP Mac address for G1 and to forward traffic for the VRRP protected IP address. It also initiates step 5.30, where R1 begins to periodically multicast VRRP advertisements to group G1 in step 5.40, the operator configures R1 as VRRP backup for VRRP group G2. This causes step 5.50 where R1 joins multicast group G2 to receive VRRP advertisements. In step 5.60, R1 load distribution function parameters are configured. In step 5.70, the operator configures Router 2 (R2) as VRRP master for VRRP group G2. This causes step 5.80, where R2 sets itself up to receive packets sent with the VRRP MAC address for G2 and to forward traffic for the VRRP protected IP address. It also causes step 5.90, where R2 begins to periodically multicast VRRP advertisements to group G2. In step 5.100, the operator configures R2 as VRRP backup for VRRP group G1. This causes step 5.110 where R2 joins multicast group G1. In step 5.120 R2's load distribution function parameters are configured.

In step 5.120 R1 receives the VRRP advertisements from R2 and by running a local algorithm (e.g., numerically highest IP address of all the VRRP routers) determines that R1 is LDF master. Similarly, in step 5.130 R2 sees the VRRP advertisements from R1 and can conclude that R2 is not LDF master In step 5.140, host (401) A is configured to use VIP1 (not shown) as its default router and subsequently, in step 5.150 sends a packet to the destination (407). Host A needs the MAC address of its default router so, in step 5.160, Host A broadcasts an "ARP whohas VIP1" message. In step 5.170 the LDF master R1 receives Host As 'whohas' message and makes a load balancing decision that R2 should handle this request. In step 5.180, R2 not an LDF master ignores the ARP whohas message. In step 5.190 the LDF master R1 sends Host A an ARP reply with VRRP G2 VMAC address indicating that R2 (405) will forward traffice from Host A. In step 5.200 Host A uses the MAC it received to send the packet out.

When the first router in the set becomes active no VRRP advertisements are received from any other router (because no others are yet active) and the first router assumes the LDF mastership. The LDF router then computes the table shown below and programs its ARP/ND mechanism to answer for all the VRRP MAC address for all N*(N-1) groups (setting up VRRPs with virtual MAC addresses)

As hosts become active and ask for the L2 address of their default router, the LDF master uses a round robin procedure to select a VRRP MAC address using the list formed as described above. Note that the LDF master does this as though all the configured routers are currently operational; whatever subset of the routers that are operational will rebalance the load. Using equal weighted or simple round robin on this list, the Hosts are distributed to all the available VRRP groups (all headed by a single LDF master).

The LDF master also piggybacks its own position and the index of list entry it gave out for the most recent request it processed, i.e., the index of the last assigned router, onto the VRRP advertisements that it sends.

For the purpose of the running example, assume that the first router to come up is R3. Since R3 is first, it will compute table 2 as shown above and determine that R3 is LDF master. Assume also that R1 comes up and it happens that R1 has a numerically lower IP address than the first router, R3; so, R1 will not become LDF master. R1 also computes table 2 as shown above. The second router, R1, is configured to have position POS 1 (in the example), so R1 programs its Ethernet receive mechanism to receive packets sent to the Ethernet destination MAC addresses for the VRRP MAC addresses in column 1 and R1 begins to send VRRP advertisements on which it piggybacks its position.

For the running example, R1 programs its Ethernet receive mechanism to receive packets sent to the Ethernet destination Mac addresses for VRRP groups 101, 102, 103 & 104.

The newly booted router (R1) is also receiving VRRP advertisements and can deduce which routers are up; it (R1) also programs its Ethernet receive mechanism to receive packets with the virtual MACs in its row of the table shown above for each column that corresponds to an unavailable router. For example, R1 will become VRRP master for VRRP groups 105, 113 and 117

All the available routers rerun this process because they have seen VRRP advertisements from a new VRRP router (R1 in the running example) and as a result reprogram their Ethernet receive mechanisms to not receive packets with the virtual MACs now being handled by the new router. In the example, R3 will stop receiving packets with the VMACs from VRRP groups 101, 102, 103, 104 and 105, 113 and 117.

The LDF master sees that a new router has come up, because it sees the VRRP advertisements that are being sent. The LDF master concludes that it is still the LDF master because its IP address is numerically higher compared to the VRRP advertisements it has received from the new router.

When a new, enhanced VRRP router begins to send advertisements or when an existing enhanced VRRP router stops sending VRRP advertisements the remaining enhanced VRRP routers all check whether more than one router is down in the set of N configured routers.

FIGS. 6a and 6b are diagrams of the extended VRRP advertisement packets which are send by LDF masters in accordance with a preferred embodiment of the present invention. The last word in the modified IPv4 and IPv6 VRRP advertisements, is new information added to the VRRP advertisement:

L—a bit, 1=LDF master, 0 is not
Pos—the configured POS of the router sending the advertisement
LDF LastIndex—index of last used position by the LDF master. If a new LDF master appears, it starts with this value.

Note that this encoding supports (weighted) round robin. Other policies (e.g., weighted least connection) are possible and the LDF master will send additional information which depends on those policies. (For weighted least connection, LDF master would need to send current loads per router.

FIG. 7 is a diagram showing the data structures used when more than 1 router is down and each active router must determine the "orphaned" VRRP groups for which an active router must assume mastership in accordance with a preferred embodiment of the present invention. Every router maintains a count of the active routers, X, 703 from the configured set and a list of active routers 701 in the configured set, sorted by their position id. It also assigns each router a relative position id 702, starting from 1. If X 703 is 1 (i.e., there is one active router) then that router is master for all VRRP groups and LDF master. If X 703 router is N−1, then each router looks at table 1, in the row for its own configured position and in the column of the configured position of the inactive router and assumes mastership of the VRRP group found there. When X 703 is greater than 1 but less than N−1 (where N equals the number of routers), each active router scans its table, in the same way (e.g. all row-wise or all column-wise) for non-diagonal entries where both the row and column correspond to inactive routers. Thus, each router forms a list of "orphaned" VRRP groups 704. In this case, the list of orphaned VRRP groups is not empty. Each router will:

1) Examine every orphaned VRRP group on the list 704
2) For each orphaned group, compute (index modulo X) 706
3) compare (index modulo X) with its relative position id and
   a. if equal, this router assumes mastership of the orphaned VRRP group with this index
   b. if zero, and if this routers relative position ID equals X 703, the number of active routers then this router assumes mastership of the orphaned VRRP group with index 705;
   c. otherwise, skip to the next element In this way, the orphaned VRRP groups are handled by the available routers.

Referring back to FIG. 3 in the running example, R1 and R3 are up, and the R2, R4 and R5 are down. R1 and R3 each compute:

List of active routers: R1, R3
Relative position: 1, 2
Count of active routers (X): 2
List of orphaned VRRP groups: 114, 118, 107, 120, 108, 116
Index list: 1, 2, 3, 4, 5, 6
Index modulo X list: 1, 0, 1, 0, 1, 0
R1 (relative position 1) will assume mastership of 114, 107, and 108
R3 (relative position 2) will assume mastership for 118, 120, and 116.

Thus:
R1 becomes VRRP master for: 101, 102, 103, 104, 105, 113, 117, 114, 107, 108
R3 becomes VRRP master for: 109, 110, 111, 112, 106, 115, 119, 118, 120, 116

As hosts request MAC addresses of their default routers, they are told of VRRP MAC addresses according to the previous section.

New LDF Master

In a second situation another router in the group comes up and it happens that this router has a numerically higher IP address than the current LDF master router. Table 1, above, is calculated by the newly activated router. The newly booting router is configured to have a position POS so it programs its Ethernet receive mechanism to receive traffic for the VRRP MAC addresses in column POS. It is also receiving VRRP advertisements and can deduce which routers are up and it programs its Ethernet receive mechanism to receive packets with the virtual MACs in its row of the table for each column of the table that corresponds to an unavailable router.

When a new router sends its VRRP advertisement or when an existing enhanced VRRP stops sending its VRRP advertisement, all the available routers see that a new VRRP router has come up or that an existing router has gone away and the available routers rerun their procedures to determine LDF mastership and to reprogram their Ethernet receive mechanisms to insure they are receiving packets for the current set of virtual MACs as determined by the LDF configuration and current set of routers.

The new router sees the VRRP advertisements from the other routers and concludes that it will become the next LDF master because its source address is numerically higher. It looks at the piggybacked information from the last advertisement of the previous LDF master, and uses the index into the list from that message as its starting index to distribute the next host request that it gets. The new LDF master also begins immediately sending its VRRP advertisements.

For example, suppose R5 comes up. It becomes VRRP master for the VRRP groups 117, 118, 119 and 120 and it starts sending VRRP advertisements with its POS and with the last used index it received from the last VRRP advertisement from R3. Since R2 and R4 are down, it also becomes VRRP master for 108 and 116. R1 and R3 see the new router and readjust: R1 becomes VRRP master for 101, 102, 103, 104, 105 and 113. R3 becomes VRRP master for 109, 110, 111, 112, 106 and 119 (R5 is becoming master for these groups).

A change in the set of enhanced VRRP routers caused this router, to now act as LDF master. That is, a new enhanced VRRP router began to send advertisements or an existing, enhanced VRRP router stopped sending VRRP advertisements. The active enhanced VRRP routers follow the procedure (described above) to determine which, if any, orphaned VRRP groups they should master.

In the running example, R1, R3 and R5 are active and the R2 and R4 are inactive. R1, R3 and R5 each compute:
 List of active routers: R1, R3, R5
 Relative Position 1, 2, 3
 Count of active routers (X): 3
 List of orphaned VRRP groups: 114, 107
 Index list: 1, 2
 Index modulo X list: 1, 2
 R1 (relative position 1) will assume mastership of 114
 R3 (relative position 2) will assume mastership for 107.
Thus:
R1 becomes VRRP master for: 101, 102, 103, 104, 105, 113, 114
 R3 becomes VRRP master for: 109, 110, 111, 112, 106, 115, 107
 R5 becomes VRRP master for: 117, 118, 119, 120, 108, 116

As hosts come up they are given VRRP MAC addresses according to the previous section. The LDF master also piggybacks the index of the last entry of the list it assigned onto the VRRP advertisements that it sends.

Remaining Routers Come Up

Another router comes up and it behaves as described previously. It will not become LDF master. Since only one router in the group is not up, the LDF will not have to distribute any "excess" groups. All the VRRP groups will be distributed by the process of each router looking in the unavailable routers column and taking the VRRP groups that they find therein along with the VRRP groups that the nominally master, that is, the groups that appear in their column of the table.

In the running example, suppose R2 comes up. Then,
 R1 becomes VRRP master for: 101, 102, 103, 104, 113:
 R2 becomes VRRP master for: 105, 106, 107, 108, 114:
 R3 becomes VRRP master for: 109, 110, 111, 112, 115: and
 R5 becomes VRRP master for: 117, 118, 119, 120, 116

When the last router comes up, the allocation of VRRP groups, for the running example, will be as given in table 2. As above, the LDF master also piggybacks the index of the last entry of the list it assigned onto the VRRP advertisements that it sends.

A Non-LDF Master Router Goes Down

First assume that all the routers in the set are up and running. Assume that a router, Ri, (not the LDF master) goes down. Each other router, including the LDF master, notices this because they stop receiving VRRP advertisements from the newly unavailable router. Each router looks at the Ri'th column of the row corresponding to its POS in the table and programs its own mastership of that VRRP group.

Whenever a new enhanced VRRP router begins to send advertisements or when an existing, enhanced VRRP router stops sending VRRP advertisements the remaining enhanced VRRP routers all check whether more than one router is down in the set. If so, the enhanced VRRP routers each form a list of orphaned VRRP groups and (as described above) determine which of the orphaned VRRP groups' mastership should be assumed.

To continue the example, all the routers are up, so the VRRP mastership is:
 R1 becomes VRRP master for: 101, 102, 103, 104
 R2 becomes VRRP master for: 105, 106, 107, 108
 R3 becomes VRRP master for: 109, 110, 111, 112
 R4 becomes VRRP master for: 113, 114, 115, 116 and
 R5 becomes VRRP master for: 117, 118, 119, 120

Now, suppose R2 goes down. Then:
 R1 becomes VRRP master for: 101, 102, 103, 104, 105
 R3 becomes VRRP master for: 109, 110, 111, 112, 106
 R4 becomes VRRP master for: 113, 114, 115, 116, 107 and
 R5 becomes VRRP master for: 117, 118, 119, 120, 108

In this case, only 1 router is down, so the set of enhanced VRRP routers need not check whether to reprograms their Ethernet receive mechanisms to receive packets with "orphaned" virtual MACs LDF Master Router Goes Down Assume that all the routers are initially available and further assume that the LDF master router becomes unavailable. Each other router notices this because they stop receiving VRRP advertisements from the LDF master. Each router looks at its row in each router's associated table in the column corresponding to the LDF master. The routers each program their own Ethernet receive mechanism to become VRRP master for that group.

Each router determines that the LDF master failed, and the router with the next highest IP address assumes the LDF master role.

There is now a new LDF master, and either a new enhanced VRRP router began to send advertisements or an existing enhanced VRRP speaker stopped sending VRRP advertisements. The remaining enhanced VRRP routers all check whether more than one router is down in the set. If so, the active enhanced VRRP routers follow the procedure (described above) to determine which, if any, orphaned VRRP groups they should master.

To continue the example, assume all the routers are up, so the VRRP mastership is:
 R1 becomes VRRP master for: 101, 102, 103, 104
 R2 becomes VRRP master for: 105, 106, 107, 108
 R3 becomes VRRP master for: 109, 110, 111, 112
 R4 becomes VRRP master for: 113, 114, 115, 116 and
 R5 becomes VRRP master for: 117, 118, 119, 120

Now assume that R5 goes down, and R4 will become the new LDF master. Only one router is down, so no router needs to calculate the orphaned list, instead each router consults the row in the table that corresponds to its position and assumes VRRP mastership for the VRRP group in R5's column. The allocation is:
 R1 becomes VRRP master for: 101, 102, 103, 104, 117
 R2 becomes VRRP master for: 105, 106, 107, 108, 118
 R3 becomes VRRP master for: 109, 110, 111, 112, 119 and
 R4 becomes VRRP master for: 113, 114, 115, 116, 120

R4 will become the new LDF and it will use the last index that R5 sent out when R4 needs to assign the next new request.

A Host's L2 Entry for the Gateway Times Out

When a host initially needs the MAC address for its gateway, it broadcasts (IPv4) or multicasts (IPv6) its ARP/ND request. The LDF master exploits this by being the network entity that replies. After some time (nominally 20 minutes) the L2 MAC address will timeout and the host, when it tries to send IP traffic again, it will send another ARP/NS request. In each case, the re-ARP or re-NS messages are unicast messages. In one case, the LDF master may be the same as it was the last time the host ARPed or NS requested. However, it can be the case that, the LDF master has moved between the time the LDF initially assigned the VRRP group, and the host timed out. In this case, the unicast re-ARP or re-NS message will go to a router that is not the LDF master. However, this is not a problem, because one of the available routers has responsibility for the VRRP group since that addressed router will reply to a unicast ARP request or unicast NS request. Note that these routers do not respond to a broadcast or multicast request as described previously.

WRR Policy

In this case, the above described Round Robin procedure is modified as follows. Assume that each router is configured with the same list of weights with N entries. The weight associated with router i is Wi and the sum of the weights is Wsum.

The LDF master forms a list that is Wsum*(N−1) long, so that each virtual MAC must appear at least once. For the N routers, it round robins from the virtual MACs associated with each router according to the weight.

For example, if there are four routers, with a SV of 151, the table is:

TABLE 3

|    | Weight |
|----|--------|
| R1 | 3      |
| R2 | 2      |
| R3 | 1      |
| R4 | 1      |

TABLE 4

| POS |    | 1<br>R1 | 2<br>R2 | 3<br>R3 | 4<br>R4 |
|-----|----|---------|---------|---------|---------|
| 1   | R1 | —       | 154     | 157     | 160     |
| 2   | R2 | 151     | —       | 158     | 161     |
| 3   | R3 | 152     | 155     | —       | 162     |
| 4   | R4 | 153     | 156     | 159     | —       |

Assume that the weights are 3, 2, 1, and 1. The list will be Wsum*(N−1)=7*3=21 long.

For the 1st Wsum entries, it takes W1 VMACs from R1 (151, 152, 153), W2 VMACs from R2 (154, 155, 156), W3 VMACs from R3 (157, 158, 159) and W4 VMACs from R4 (160, 161, 162) yielding: 151, 152, 153, 154, 155, 157, 160.

The 2nd Wsum entries are found by continuing in the same way, (and remembering what position to start at) and this yields 151, 152, 153, 156, 154, 158, 161.

The 3rd Wsum entries are found similarly and this yields: 151, 152, 153, 155, 156, 159, 162.

The full list is found by catenation of the N−1 sub-lists and this list can be constructed by any router. This list is: 151, 152, 153, 154, 155, 157, 160, 151, 152, 153, 156, 154, 158, 161, 151, 152, 153, 155, 156, 159, 162.

This list is used in the Round Robin procedure above and the index of the list is piggybacked onto the LDF master's VRRP advertisements.

Note that some further (small scale) optimization is possible by permuting the sub-lists (so that the first W1 hosts do not all go to R1); however by the initial assumption that the number of hosts, H>>N means that the gains due to this small scale optimization will be small.

When all of the enhanced routers are not available, the load that would have been handled by the unavailable routers is equally distributed to the remaining routers; note that in this case, the distribution of the load is not according to the weights.

In summary, a set of routers is configured to provide IP gateway services to a set of hosts where each router in the set backs up all the other routers in the same set. Each router in the set utilizes identical load distribution policies, the same load distribution properties and the same load distribution arrangement. A Load distribution function (LDF) master router is determined for the set of routers and the LDF master is the only router to respond to ARP "whohas" messages or neighbor solicitation messages. Also, each router in the set of routers is capable of becoming an LDF master router in the event the current LDF master becomes unavailable.

Every router in the set of routers utilizes the same algorithm to compute load distribution and all routers that are VRRP masters are sending VRRP advertisement messages, containing load balancing information to all the routers.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method for distributing load in a network, the method comprising the steps of:
    configuring a set of routers for providing Internet Protocol (IP) gateway services to a set of hosts, each router in the set of routers backing up all the other routers in the same set using Virtual Router Redundancy Protocol (VRRP), all routers receiving all VRRP MAC addresses for all VRRP groups, each host configured to use a single IP address for their default gateway;
    each router in the set utilizing identical load distribution policies, load distribution properties and load distribution arrangement;
    determining a Load Distribution Function (LDF) master router for the set of routers, wherein the LDF master is the only router to respond to Address Resolution Protocol (ARP) "whohas" messages or Neighbor Solicitation messages which are received by all the routers and wherein each one of the set of routers is capable of becoming an LDF master router in the event the current LDF master becomes unavailable;
    every router in the set of routers utilizing the same algorithm to compute load distribution;
    all routers that are Virtual Router Redundancy Protocol (VRRP) masters are sending VRRP advertisement messages to all the routers, wherein the VRRP advertisement includes load balancing information to enable any one of the routers to replace the LDF master router; and
    dynamically adjusting load as routers are added to the network by the master router considering its own position, and each router's position in the set of routers and the routers that are added positions.

2. The method of claim 1, wherein the LDF master router is determined by the LDF master router's IP address.

3. The method of claim 2, wherein the LDF master router IP address is the numerically highest IP address in the set of routers.

4. The method of claim 1, wherein if the LDF master router goes down, the router with the next highest IP address will take over as the new LDF master router.

5. The method of claim 1, the LDF master router computing an LDF table of routers in the router set and maintaining a list of groups according to the load distribution policy.

6. The method of claim 1 wherein all routers in the set are configured with the same LDF related information.

7. The method of claim 1, wherein all routers in the set are enhanced to prepare an LDF table identical to the LDF master router configuration.

8. The method of claim 7, wherein the enhanced routers parse the VRRP advertisement messages to determine which of the LDF set members will act as LDF master.

9. The method of claim 1, wherein an Internet Protocol version 4 (IPv4) host broadcasts Address Resolution Protocol (ARP) whohas messages to request router service and the LDF master router makes a decision to use one of the routers in the router set and sends the chosen router's Medium Access Controller (MAC) address in the ARP reply.

10. The method of claim 1, wherein an Internet Protocol version 6 (IPv6) host multicasts Neighbor Solicitation (NS) messages to request router service and the LDF master router makes a decision to use one of the routers in the router set and sends the chosen router's Media Access Control (MAC) address in the NS reply.

11. A system for distributing load in a network, the system comprising:
   means for configuring a set of routers for providing Internet Protocol (IP) gateway services to a set of hosts, each router in the set of routers backing up all the other routers in the same set using Virtual Router Redundancy Protocol (VRRP), all routers receiving all VRRP MAC addresses for all VRRP groups, each host configured to use a single IP address for their default gateway;
   means for each router in the set utilizing identical load distribution policies, load distribution properties and load distribution arrangement;
   means for determining and configuring a Load Distribution Function (LDF) master router for the set of routers, wherein the LDF master is the only router to respond to ARP "who has" messages or Neighbor Solicitation messages which are received by all the routers and wherein each one of the set of routers is capable of becoming an LDF master router in the event the current LDF master becomes unavailable;
   means for every router in the set of routers utilizing the same algorithm to compute load distribution;
   means for sending the are Virtual Router Redundancy Protocol (VRRP) advertisement messages to all the routers in the router set, wherein the VRRP advertisement includes load balancing information to enable any one of the routers to replace the LDF master router; and
   means for dynamically adjusting load as routers are added to the network by the master router considering its own position, and each router's position in the set of routers and the routers that are added positions.

12. The system of claim 11, wherein the LDF master router is determined by the LDF master routers IP address.

13. The system of claim 12, wherein the LDF master router IP address is the numerically highest IP address in the set of routers.

14. The system of claim 11, wherein if the LDF master router goes down, the router with the next highest IP address will take over as the new LDF master router.

15. The system of claim 11, wherein the LDF master router includes means for computing an LDF table of routers in the router set and maintaining a list of groups according to the load distribution policy.

16. The system of claim 11 wherein all routers in the set are configured with the same LDF related information.

17. The system of claim 15, wherein all routers in the set include means for preparing an LDF table identical to the LDF master router configuration.

18. The system of claim 17, wherein the all routers in the set parse the VRRP advertisement messages LDF related information to determine which of the LDF router set members will act as LDF master.

19. The system of claim 11, wherein an IPv4 host broadcasts Address Resolution Protocol (ARP) whohas messages to request router service and the LDF master router having means for making a decision to use one of the routers in the router set and sends the chosen router's MAC address in the ARP reply.

20. The system of claim 11, wherein an Internet Protocol version 6 (IPv6) host multicasts Neighbor Solicitation (NS) messages to request router service and the LDF master router having means for making a decision to use one of the routers in the router set and sends the chosen router's Media Access Control (MAC) address in the NS reply.

* * * * *

UNITED STATES PATENT AND TRADEMARK OFFICE
CERTIFICATE OF CORRECTION

PATENT NO.       : 8,547,844 B2
APPLICATION NO.  : 11/775422
DATED            : October 1, 2013
INVENTOR(S)      : Nadas et al.

It is certified that error appears in the above-identified patent and that said Letters Patent is hereby corrected as shown below:

In the Drawings:

In Fig. 2, Sheet 2 of 7, in Step "2.90", in Line 1, delete "(1B.2" and insert -- (1B.2) --, therefor.

In the Specification:

In Column 2, Line 42, delete "'n'" and insert -- '1/n' --, therefor.

In Column 3, Line 20, delete "art the" and insert -- art, the --, therefor.

In Column 3, Line 60, delete "routers:" and insert -- routers; --, therefor.

In Column 4, Line 64, delete "who has" and insert -- whohas --, therefor.

In Column 8, Line 17, delete "As" and insert -- A's --, therefor.

In Column 8, Line 22, delete "traffice" and insert -- traffic --, therefor.

In the Claims:

In Column 15, Line 25, in Claim 11, delete ""who has"" and insert -- "whohas" --, therefor.

In Column 15, Line 32, in Claim 11, delete "the are" and insert -- the --, therefor.

In Column 16, Line 4, in Claim 12, delete "routers" and insert -- router's --, therefor.

In Column 16, Line 21, in Claim 18, delete "wherein the all" and insert -- wherein all --, therefor.

Signed and Sealed this
Twentieth Day of May, 2014

Michelle K. Lee
*Deputy Director of the United States Patent and Trademark Office*